United States Patent [19]

Weisner et al.

[11] 4,344,261
[45] Aug. 17, 1982

[54] SKYLIGHT

[75] Inventors: Kent A. Weisner, Orlando; Lester L. Walls, Jr., Deltona, both of Fla.

[73] Assignee: Kennedy Sky-Lites, Inc., Orlando, Fla.

[21] Appl. No.: 168,536

[22] Filed: Jul. 14, 1980

Related U.S. Application Data

[62] Division of Ser. No. 12,822, Feb. 16, 1979, Pat. No. 4,278,414.

[51] Int. Cl.³ .............................................. E04B 7/18
[52] U.S. Cl. ......................................... 52/200; 52/788
[58] Field of Search ........................... 52/200, 72, 788; 428/34

[56] References Cited

U.S. PATENT DOCUMENTS 3,934,383 1/1976 Perry et al. ............................ 52/200

FOREIGN PATENT DOCUMENTS

| | | | |
|---|---|---|---|
| 260503 | 3/1968 | Austria .................................. | 52/200 |
| 1290325 | 3/1969 | Fed. Rep. of Germany ........ | 52/200 |
| 444442 | 2/1968 | Switzerland .......................... | 52/200 |
| 829442 | 3/1960 | United Kingdom .................. | 52/200 |

OTHER PUBLICATIONS

Progressive Architecture, Mar. 1955, p. 163.

*Primary Examiner*—Alfred C. Perham
*Attorney, Agent, or Firm*—Duckworth, Allen, Dyer & Pettis

[57] ABSTRACT

An improved skylight having high structural strength and improved insulation capabilities. A sheet of polycarbonate plastic is formed into an outer dome having an extended flange around the perimeter of the dome. The extended flange has first and second steps formed therein adjacent to the perimeter of the dome. A second dome having its narrow flange around its perimeter forms a middle dome having its narrow flange fitting into the first of the steps in the flange of the outer dome and having its dome spaced a short distance from the outer dome to provide a narrow dead air space having good insulation properties. A third dome having a narrow flange around its perimeter forms an inner dome in which its flange will overlap the flange of the middle dome and fit into the second step in the outer dome flange and having the inner dome spaced a short distance from the middle dome providing a second insulating dead air space to minimize heat flow through the three domes. The middle dome flange is bonded to the first step portion of the outer dome flange and the inner dome flange is bonded to the second step portion of the outer dome flange and to the inner surface of the middle dome flange. During molding of the outer dome a sharp rise or push essentially perpendicular to the outer dome flange is formed between the first step and the dome of the outer dome to prevent interference between the inner surface of the outer dome and the outer surface of the middle dome.

6 Claims, 7 Drawing Figures

U.S. Patent   Aug. 17, 1982   4,344,261
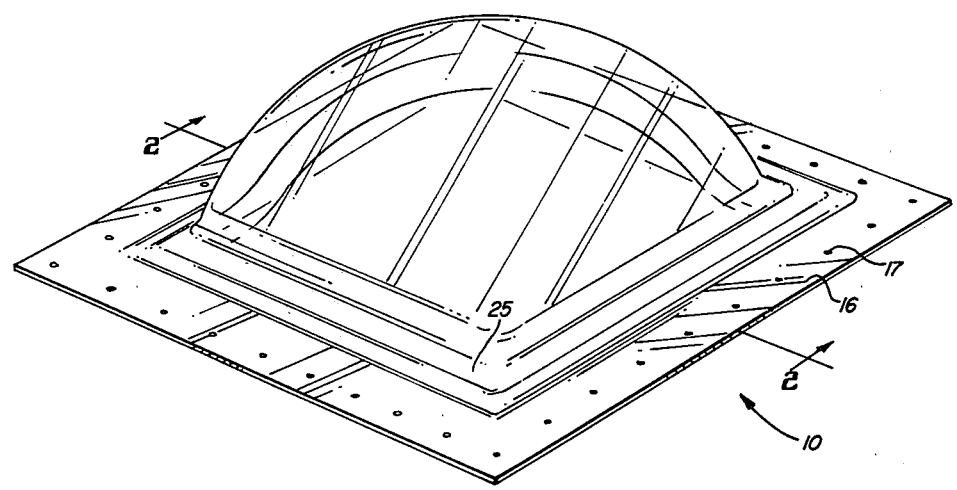
FIG-1
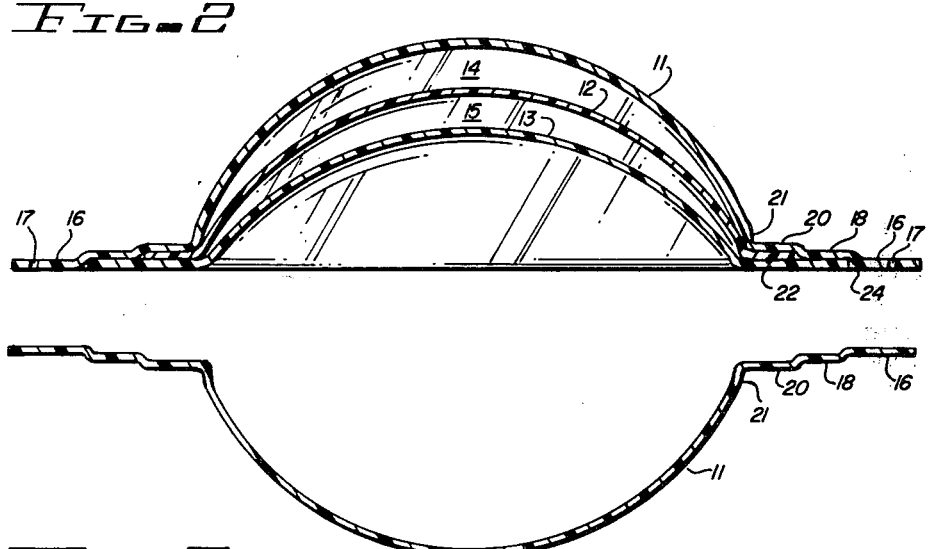
FIG-2
FIG-7

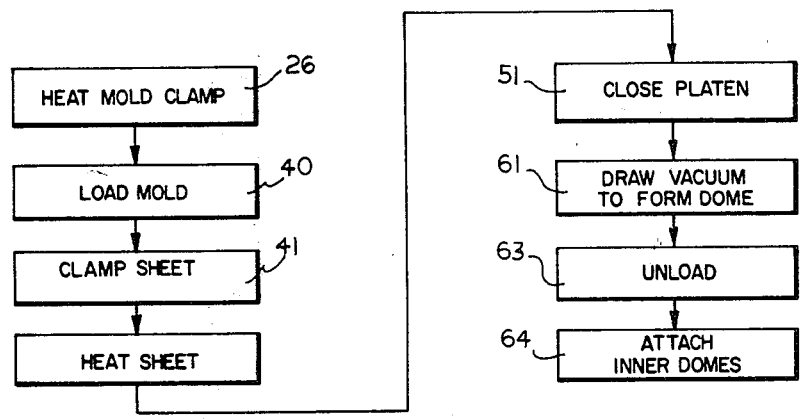
Fig. 3
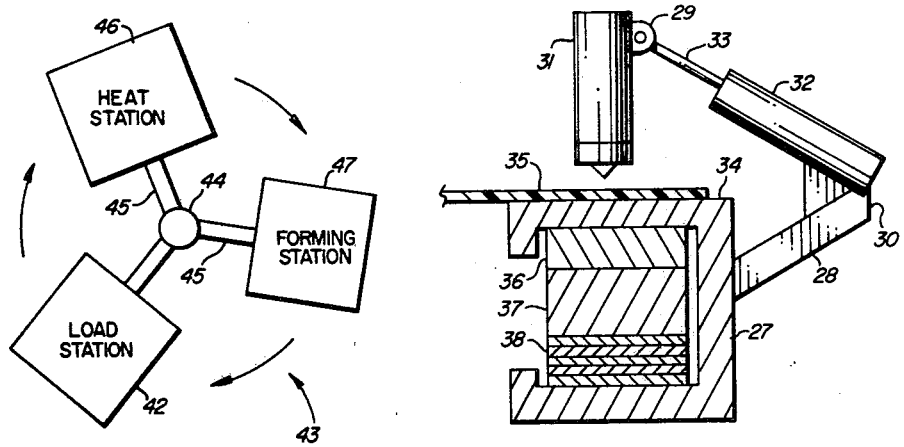
Fig. 4
Fig. 5
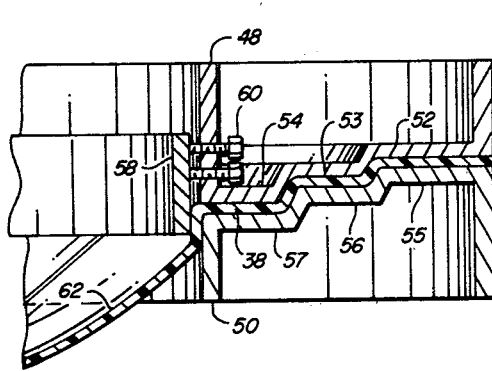
Fig. 6
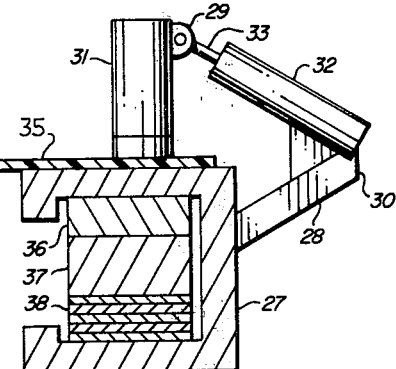

SKYLIGHT

This is a division of application Ser. No. 012,822, filed Feb. 16, 1979, now U.S. Pat. No. 4,278,414.

BACKGROUND OF THE INVENTION

The present invention relates to skylights, and especially to a skylight having a plurality of domes forming a plurality of air spaces and to a method and apparatus for making a skylight having a plurality of domes formed together.

In the past, a variety of skylights have been provided which are typically formed from thin sheets of transparent plastic material which is clamped to a mold and vacuum formed. The molds are typically formed with a domed center portion, even though this is not necessarily a spherical shaped dome and which has a perimeter flange which may be attached to the roof of a house. Typically, skylights are attached either directly to a flat portion of a roof, or alternatively, attached to a raised area where the flat perimeter portion of the skylight is covered with flashing. It has also been suggested to provide skylights with self-flashing formed around the perimeter of the skylight. In recent yeras with the emphasis on energy, it has been suggested to have domes formed with an air space between a pair of domes or between the dome and a flat translucent plastic sheet to thereby entrap air to reduce the movement of heat through the skylight.

Prior art of this type can be seen in U.S. Pat. No. 3,127,699 for a self-flashing skylight unit, which shows a pair of domes forming an air space therebetween in one embodiment, and a dome mounted to a flat transparent sheet in a second embodiment, each to form a dead air space therebetween. Another doubled dome skylight can be seen in U.S. Pat. No. 3,455,073, which mounts a pair of domes together between a plurality of seals to thereby form a dead air space between the domes. Other twin dome type skylights can be seen in U.S. Pat. No. 3,111,786 for a Skylight and Ceiling Light Construction; and in U.S. Pat. No. 4,073,097 for an energy efficient skylight construction; in U.S. Pat. No. 3,417,527 for a skylight dome and in U.S. Pat. Nos. 3,417,522 and 3,434,250 for dual dome skylights. U.S. Pat. No. 2,858,734 has a skylight having a dead air space formed with special lenses, while U.S. Pat. No. 3,350,823 is an insulated skylight having dual domes filled with a core material. U.S. Pat. No. 3,012,375 has a combination skylight and ceiling light dome formed into one unit, while in U.S. Pat. No. 3,440,779, a pair of flat panels are used to form a skylight. Additional skylight construction can be seen in U.S. Pat. No. 3,983,669 for a skylight and frame; U.S. Pat. No. 3,461,625 for a self-flashing skylight curve construction; U.S. Pat. No. 3,473,276 for a domed roof light; U.S. Pat. No. 2,703,060 for a skylight construction; U.S. Pat. No. 2,610,593 for skylight construction; U.S. Pat. No. 2,693,156 for a skylight; U.S. Pat. No. 3,996,844 for an opening skylight of great stability; and U.S. Pat. No. 3,934,383 for a roof vent.

In U.S. Pat. No. 2,918,023 to Bettcher, a skylight is illustrated having an upper and lower dome with the lower dome reversed from the upper dome, and in one embodiment, has a transparent sheet connected therebetween to form double air spaces which are reinforced in different manners, as illustrated therein.

In contrast to the prior art, the present invention is directed toward a triple dome skylight forming a pair of air spaces, but in which triple domes are faced in the same direction to provide the increased strengh of a dome over a flat member, such as illustrated in the Bettcher patent. Thus, reinforcing and supports are not required even for large domes, and the present dome is manufactured so as to form a smooth flat perimeter for attachment to a roof in a conventional manner.

SUMMARY OF THE INVENTION

The present invention relates to a method and apparatus for making a plural dome skylight, in which a thin sheet of polymer material is clamped to a vacuum mold with heated clamps. The clamps and sheet are moved to an oven where the polymer sheet is softened. It is then moved to a forming section where one mold is closed toward the other around the perimeter of the polymer sheet to form a plurality of stepped ledges in the perimeter of the polymer sheet, and simultaneously, adding a push perpendicular to the stepped ledges at the end of the stepped edges around the polymer dome, a dome is vacuum formed in the center portion of the polymer sheet, then adhesively attaching a second dome to the first with the edge portions of the second dome fitting into one step of the plurality of steps, and adhesively attaching a third dome to the first dome with its edges fitting into the second step of the plurality of steps to form a multiple dome skylight. The molding is done in a mold having a plurality of steps formed therein around the vacuum forming area for the dome, and a push attached to one platen for forming a pushed or perpendicular area along the edge of the dome, and also having a heated clamp for preheating the clamping portion of the mold.

BRIEF DESCRIPTION OF THE DRAWINGS

Other objects, features and advantages of the present invention will be apparent from the written description and the drawings, in which:

FIG. 1 is a perspective view of a multi-domed skylight in accordance with the present invention;

FIG. 2 is a sectional view taken on the line 2—2 of FIG. 1;

FIG. 3 is a flow diagram of the process of making the outer dome;

FIG. 4 is a diagram of the layout of the rotating stations of the process in accordance with FIG. 3;

FIG. 5 is a sectional view of a heating clamp for use in the process of FIG. 3;

FIG. 6 is a sectional view of the mold, platens and heating clamp for use in the process in accordance with FIG. 3; and FIG. 7 is a sectional view of the molded outer dome made in the process of FIGS. 3 through 6. CL DESCRIPTION OF THE PREFERRED EMBODIMENTS Referring to the drawings, and especially to FIGS. 1 and 2, a multi-domed skylight 10 is illustrated having an outer or first dome 11, an inner second dome 12 and an inner third dome 13. Domes 12 and 13 are each attached to outer dome 11 to form a first air pocket 14 and a second air pocket 15. The double dome is utilized to increase the insulating efficiency of the dome, inasmuch as increasing dead air space between two domes has reduced benefit as the domes are spaced further apart. Thus, the addition of two dead air spaces substantially increases the insulation value across the skylight. The dome 11 has an extended flange 16 around its periphery which has nail holes 17 therethrough which may have been punched at clamping marks produced during forming of the dome. The outer dome 11 formed with the flange 16 has a first stepped ledge 18 and a second stepped ledge 20 which connects with a perpendicular extending push 21, with each step and push extending around the dome 11. The skylight dome 12 has a short flanged area 22 which fits and is adhesively attached to the stepped area 20, while the dome 13 has a longer flanged area 24 which extends into the stepped ledge 18 where it is adhesively attached. In addition, a substantially smooth surface is provided at 24 where the step ledge is mounted adjacent the flange 16, thereby allowing the entire domed skylight to be placed on a flat roof, if desired, or alternatively, the flange 16 of the outer dome 11 can be formed with a self-flashing rim for fitting over a raised construction, in which event it is also desirable to have a flat surface at 24 for mounting the skylight to the roof. Domes 12 and 13 extending in the same direction and inside of dome 11 advantageously provide an aesthetically pleasing looking interior, as well as exterior to the skylight. This substantially increases the insulation value of the skylight and the domes have greater strength than would be provided by a flat surface extending across the bottom of the outer dome 11 which would tend to sag and would not be as attractive as the arcuate inner dome 13 from inside the building. The push area 21 allows the first inner dome 12 to be easily attached to the outer dome 11 without interference from the connecting curved edge 25 at the corner of the dome steps 20, thereby allowing the use of a polymer material that could not otherwise be accommodated in this construction.

Turning to FIGS. 3 through 7, the method of making a plural domed skylight in accordance with FIGS. 1 and 2 is illustrated with a flow diagram in FIG. 3 providing for heating the mold clamps at 26, which may be illustrated in the sectional view of FIG. 5. A clamping support channel 27 is shown in section having a clamp support rear extension 28 connected by a bracket 30 to a pneumatic cylinder 32 having a cylinder rod 33. A sheet clamping member 31 having a sharp projection 39 is attached through a flexible joint 29 to rod 33 and clamps onto sheet 35 when actuated. The clamping support surrounds the vacuum mold and provides a clamping table 34 to which a piece of thin polymer sheet 35 is shown. A heating element 36 which is a silicone heating strip is shaped to fit in the clamp supporting channel 27 and is supported by block 37 with additional adjustable blocks 38 to hold it in place directly beneath the table portion 34 of the channel 27. Heating element 36 may be an electrical heating element, which will heat the upper surface of the clamp channel 27 when actuated prior to beginning the molding operation. The heated clamp frame is then loaded at 40 with a polymer sheet 35 and clamped at 41 as illustrated in FIG. 5. In FIG. 6, the clamp has been actuated against the polymer sheet 35 and the molds are closed. During the clamping operation, projection 39 is forced into the surface of the polymer sheet 35 as it softens due to heat from clamp table 34. A multiplicity of clamps 31 are spaced around the perimeter of polymer sheet 35 as may be noted from the locations of holes 17 and flange 16 of FIG. 1. Advantageously, the pressure from clamp 31 and the penetration of projection 39 into the surface of softened sheet 35 serve to prevent flange 16 from being drawn out of the clamps during subsequent dome forming operation. The loading and clamping is done at a loading station 42 on a rotary conveyor 43 rotating on a center pivot 44 and having arms 45 extending therefrom to different tables. The loaded clamp is then rotated to heating station 46 where it is heated at step 49, rotated and molded at forming station 47 of FIG. 4. The clamping frames and thin polymer sheet are heated to soften the thin polymer sheet, at which time an upper platen 48 is closed a predetermined distance adjacent a lower platen 50 in step 51.

The platen 48 has the flange area 52, the first step 53, a second step 54 formed therein, combining with a lower flange area 55, a lower first step 56, and a lower second step 57 and having the polymer sheet 35 clamped therebetween to form the stepped outer dome 11 as shown in FIG. 7. In addition, a push element 58 may be bolted with bolts 60 from the inside of the upper platen 48 to push the push area 21. A vacuum is then drawn at 61 of FIG. 3 to pull a dome 62 as shown as FIG. 6 to form the dome 11. It will, of course, be clear that the platen 48, 50 and the push 58 extend around the entire mold to form a periphery platen with the clamping channel 27 extending adjacent the lower platen 50 around the mold, so that a vacuum placed beneath the dome portion 62 will pull the softened polymer sheet inward to form a free-formed dome. The outer dome 11 is then unloaded in step 63 to provide the dome 11 as illustrated in FIG. 7 having the flange 16, first step 18, second step 20 and pushed area 21.

The inner domes, which have been formed in a separate vacuum mold may then be attached in step 64 to the outer dome 11, as shown in FIGS. 1 and 2 by adhesively attaching the first inner dome 12 and then adhesively attaching the second inner dome 13. The inner domes are attached with a thin layer of a compound of methylene chloride and polycarbonate resin which is applied to the stepped areas, the inner domes put in place and the domes compressed together for 60 to 90 seconds to flash off methylene chloride solvent and seal the domes together. Other methods that may be used to seal the domes together include electromagnetic induction bonding using a linear saturated co-polymer polyester in a ribbon form 12 mils thick having stainless steel or iron oxide powder therein so the tape will be heated responsive to electro-magnetic energy. Yet another technique uses a laser beam on tape for bonding. It will, of course, be clear that an additional air space could be formed by a transparent plastic polymer sheet extending beneath the flanged area 16 in some smaller skylights, but would not have sufficient strength without reinforcement to be economically used in anything but the smallest skylights.

It should be clear at this point that a method and apparatus has been provided for making a plural domed skylight, but it may not be clear that the skylight and methods herein shown have been developed for use with a predetermined polycarbonate polymer which provides a transparent plastic of greater strength, but which is otherwise difficult to form in a plural domed skylight. It might also not be clear that for proper operation the clamping brackets 27 need to be preheated to a temperature range of 175°–250° F., so that when shifted to the heating or oven station 46, the heating of the plastic material will further heat the clamps to a temperature range of 250°–320° F. thereby producing the uniform heating required in the forming of polycarbonate polymer materials. The molds at the forming station may or may not be heated. This is dependent upon thickness and type of polymer used. Accordingly, the present invention is not to be construed as limited to the particular forms disclosed herein, which are to be regarded as illustrative rather than restrictive.

We claim:

1. A skylight comprising in combination:
   a first dome having two step ledges around its perimeter and a vertical portion adjacent one step extending substantially perpendicular to said step and connected to the central dome area;
   a second dome having a perimeter sized to fit into one step formed in the perimeter of said first dome and adhesively attached thereto and having a central dome area extending into said first dome; and
   a third dome having a perimeter sized to fit a second step of said first dome and adhesively attached thereto and having a dome portion extending into said second dome to form a triple dome skylight having two insulated air spaces.

2. A self-flanged skylight having high structural stength and a high insulation value comprising:
   an outer dome formed from a first essentially transparent polymer sheet;
   an extended flange formed by a continuation of said first polymer sheet and disposed around the periphery of said outer dome;
   an inner dome formed from a second essentially transparent polymer sheet having a first short flange disposed around the periphery of said inner dome;
   a middle dome formed from a third essentially transparent polymer sheet having a second short flat flange shorter than said first flat flange disposed around the periphery of said middle dome;
   a first step formed in a portion of said extended flange between the outer edge thereof and said outer dome, said first step having a depth essentially equal to the thickness of said second polymer sheet forming said inner dome;
   a second step formed in a portion of said extended flange and said outer dome, said second step having a thickness of said third polymer sheet forming said middle dome;
   a vertical portion formed at the perimeter of said outer dome at the junction of said second step and said outer dome;
   said middle dome adapted to permit the outer perimeter of said second short flat flange to fit closely within said second step and the outer perimeter of said middle dome to fit within the inner perimeter of said outer dome, said vertical portion in said outer dome permitting such fitting without interference between the inner surface of said outer dome and the outer surface of said middle dome at the perimeters thereof, wherein said middle dome is closely spaced with respect to said outer dome to form a narrow dead air space for thermal insulation;
   said inner dome adapted to permit the perimeter of said first short flat flange to fit closely within said first step and to overlap the inner face of said second short flat flange of said middle dome wherein said inner dome is closely spaced with respect to said middle dome to form a narrow dead air space for thermal insulation; and
   bonding means for bonding said second short flat flange to said second step and for bonding said first short flat flange to said first step and to said inner face of said second short flat flange of said middle dome.

3. The skylight as defined in claim 2 in which said polymer sheet is a polycarbonate plastic sheet.

4. The skylight as defined in claim 2 in which said extended flange includes holes therethrough for nailing the skylight to a desired surface.

5. The skylight as defined in claim 2 in which said vertical portion is formed by portions of said outer dome extending at essentially right angles to said extended flange to thereby prevent such interference.

6. The skylight as defined in claim 2 in which said extended flange includes a multiplicity of holes for nailing said skylight directly to a surface on which said skylight is to be installed.

* * * * *